(12) United States Patent
Maurath et al.

(10) Patent No.: US 8,766,614 B2
(45) Date of Patent: Jul. 1, 2014

(54) APPARATUS FOR IMPEDANCE MATCHING (75) Inventors: Dominic Maurath, Freiburg (DE);
Yiannos Manoli, Freiburg (DE)

(73) Assignee: Albert-Ludwigs-Universitat Freiburg,
Freiburg (DE)

( * ) Notice: Subject to any disclaimer, the term of this patent is extended or adjusted under 35 U.S.C. 154(b) by 0 days.

(21) Appl. No.: 13/884,649

(22) PCT Filed: Nov. 11, 2011

(86) PCT No.: PCT/EP2011/005685
§ 371 (c)(1),
(2), (4) Date: Jul. 9, 2013

(87) PCT Pub. No.: WO2012/062477
PCT Pub. Date: May 18, 2012

(65) Prior Publication Data
US 2014/0043001 A1 Feb. 13, 2014

(30) Foreign Application Priority Data
Nov. 12, 2010 (DE) .......................... 10 2010 051 088

(51) Int. Cl.
*H02M 3/158* (2006.01)
(52) U.S. Cl.
USPC ............................ 323/282; 323/208; 323/284
(58) Field of Classification Search
USPC .................................. 323/208–211, 282–290
See application file for complete search history.

(56) References Cited

U.S. PATENT DOCUMENTS

| | | | |
|---|---|---|---|
| 5,396,165 A * | 3/1995 | Hwang et al. | 323/210 |
| 6,657,419 B2 * | 12/2003 | Renyolds | 323/285 |
| 7,265,528 B2 * | 9/2007 | Kotani et al. | 323/285 |
| 2005/0218964 A1 | 10/2005 | Oswald et al. | |
| 2006/0176029 A1 | 8/2006 | McGinty et al. | |
| 2008/0136383 A1 | 6/2008 | Hasegawa et al. | |
| 2009/0015229 A1 | 1/2009 | Kotikalapoodi | |
| 2009/0067208 A1 | 3/2009 | Martin et al. | |
| 2009/0085535 A1 | 4/2009 | Wei | |
| 2009/0127976 A1 | 5/2009 | Ward et al. | |
| 2009/0167267 A1 | 7/2009 | Dwarakanath et al. | |
| 2010/0026208 A1 | 2/2010 | Shteynberg et al. | |
| 2010/0026263 A1 | 2/2010 | Moussaoui et al. | |

FOREIGN PATENT DOCUMENTS

| | | |
|---|---|---|
| DE | 102009027347 A1 | 1/2010 |
| EP | 1608053 A1 | 12/2005 |
| WO | 2007048052 A2 | 4/2007 |

* cited by examiner

*Primary Examiner* — Jessica Han
(74) *Attorney, Agent, or Firm* — The Webb Law Firm, P.C.

(57) ABSTRACT

An apparatus for impedance matching of an electrical load to a generator has input connections for connection to the generator and output connections for connection to the load. The apparatus has a converter which connects the input connections to the output connections. An input voltage which is applied between the input connections can be converted into an output voltage. The converter has energy storage means connected to one of the output connections by an active diode, a controllable switching device, and an actuation device. The switching device can be moved to a first and a second switching state so that energy from the generator is stored in the energy storage means in the first switching state. Energy which is stored can be output to the load in the second switching state. A detector is connected to the input connections for detecting a measurement signal for the impedance matching. The actuation device has an activation signal and can be moved to a first and a second operating state. The energy which is output by the generator is temporarily stored in an input capacitor.

13 Claims, 7 Drawing Sheets

APPARATUS FOR IMPEDANCE MATCHING

CROSS REFERENCE TO RELATED APPLICATION

This application claims the benefit of International Patent Application No. PCT/EP2011/005685 entitled "Apparatus for Impedance Matching", which claims priority to German Application No. 102010051088.2, filed Nov. 12, 2010, which are hereby incorporated by reference in their entirety.

BACKGROUND OF THE INVENTION

1. Field of the Invention

The invention relates to an apparatus for the impedance matching of an electrical load to the source impedance of a generator wherein the apparatus has input connections for connection to the generator and output connections for connection to the load; wherein the apparatus has a converter, which connects the input connections to the output connections by means of which an input voltage, which is applied between the input connections, can be converted into an output voltage different from this voltage produced between the output connections; wherein the converter has an energy storage means, a controllable switching device which is connected to said energy storage means and an actuation device for said switching device; wherein the switching device is designed and can be moved to a first and a second switching state in such a way that energy from the generator can be stored in the energy storage means in the first switching state and energy which is stored in the energy storage means can be output to the load in the second switching state; and wherein the apparatus has a detector, which is connected to the input connections, for detecting a measurement signal for the impedance matching; wherein the actuation device has an activation input by means of which it can be moved to a first and a second operating state; wherein the actuation device is designed in such a way that the first switching state is avoided in the first operating state and a changeover is made between the switching states in the second operating state; and wherein the detector is connected to the activation input by way of its measurement signal output.

2. Description of Prior Art

Such an apparatus, which, as a generator, has an antenna that outputs an alternating voltage in an electromagnetic field, is known from US 2009/0067208 A 1. The antenna is connected to an electrical load by means of an impedance-matching module, a rectifier module for converting the alternating voltage into a direct voltage, and a direct voltage-direct voltage converter. The direct voltage-direct voltage converter has, as an energy storage means, an inductor connected to a first connection with one output of the rectifier module and, with its second connection, to the load by way of a semiconductor diode and a controller module connected in parallel with said diode. The second connection can also be connected to ground potential by way of the controller module. A measuring device is provided for detecting a measurement signal for the output voltage of the rectifier module. In the measuring device, the output voltage of the rectifier module is compared to an upper threshold and a lower threshold. If the output voltage is above the upper threshold, the direct voltage-direct voltage converter is activated and if the output voltage is below the lower threshold, the direct voltage-direct voltage converter is deactivated. As the inductor is connected in the circuit before the impedance-matching module, the apparatus has a relatively complicated structure.

The object of the invention is, therefore, to create an apparatus of the aforementioned type that has a simple structure but still allows impedance matching of a load with a low loss to the source impedance of a generator having a broadband, nonharmonic output voltage in particular, in such a way that the said generator outputs a power that is as high as possible.

SUMMARY OF THE INVENTION

This object is achieved with an apparatus of the aforementioned type in such a way that the energy storage means is connected to at least one of the output connections by way of an active diode; that the active diode has a controllable switching element and a comparator, said comparator has a first comparator input connected to a first load connection of the switching element and a second comparator input connected to a second load connection of the switching element; and that the output of the comparator is connected to a control connection of the switching element and a control input of the switching device.

The apparatus of the invention makes it possible to match the impedance of a load continuously to a micro-engineered or precision-engineered generator by means of an implicit duty-cycle controller in such a way that the instantaneous input voltage applied by the generator to the input connections of the apparatus is either very close to the voltage at which the generator outputs its maximum power or is identical to this voltage. Using the apparatus, such a power matching is even possible when the output voltage is considerably higher than the input voltage. The converter operates with particularly low loss because the switching device is inhibited from switching when an insufficient voltage is applied to the input connections. For this reason, the apparatus can be combined with energy harvesting generators. Generator powers of a few 10s of µW suffice to operate the apparatus. Consequently, the apparatus makes possible virtually continuous impedance matching even with alternating, pulsing or constant input voltages. The impedance matching has a large dynamic range. In addition, the apparatus is of a compact size. The apparatus can be operated in a power-saving mode.

It is advantageous if the energy storage means has at least one inductor. However, other embodiments in which the energy storage means comprises a plurality of electrical capacitors that can be switched between a parallel connection and a series connection by means of a switching device are also conceivable.

In one practical embodiment of the invention, the comparator exhibits hysteresis. The number of switching operations that the switching element performs is then reduced and thus the apparatus can be operated to save even more power.

In another advantageous embodiment of the invention, the output of the comparator is connected to the control input of the switching device by way of a delay element. The number of switching operations that the switching element performs can also be reduced by this measure in a simple manner.

It is practical and advantageous if the input connections are connected to one another by way of an input capacitor serving as a buffer. The input capacitor can then absorb energy from the generator during those phases when the converter is inactive, i.e., the energy output by the generator during the first operating state is temporarily stored (buffered) in the input capacitor. The input capacitor must be sized such that the input voltage applied across it can, at all times, follow the generator voltages, which are not at all harmonic, so that the best possible impedance matching is provided at all times.

In one practical embodiment of the invention, the active diode has a field effect transistor as the switching element. The apparatus can thus be operated to save even more power.

In one refinement of the invention, the switching device has a switching transistor by way of which the energy storage means can be connected to one input connection wherein the switching transistor has a control input that is connected to the output of the comparator providing the control signal. This results in an implicit duty-cycle control of the switching controller formed of the energy storage means, the switching device and the actuation device providing a stable and low-loss voltage conversion even with changing input voltages and high source impedances.

It is advantageous if the actuation device has a clock generator for generating a clock signal and if the output of the comparator is connected to the switching transistor to provide the control signal synchronized with the clock signal by way of a synchronization device connected to the clock generator. A limited current in the energy storage means is facilitated by the clock generator. This reduces line losses. Consequently, the power is matched with even lower losses.

The converter may have different topologies. In one practical embodiment of the invention, the energy storage means connects a first input connection of the apparatus to a node wherein the node can be connected to one output connection of the apparatus by way of the switching element and to a second input connection of the apparatus by way of the switching device. The converter is then configured for boost operation, i.e., the output voltage is larger than the input voltage of the apparatus.

In another advantageous embodiment of the invention, a first input connection of the apparatus can be connected to a node by way of the switching device and a second input connection of the apparatus can be connected by way of the switching element wherein the node is connected to an output connection of the apparatus by way of the energy storage means. The converter is then configured as a buck converter, i.e., the output voltage is smaller than the input voltage of the apparatus.

In one refinement of the invention, a first input connection of the apparatus can be connected to a node by way of the switching device and an output connection of the apparatus can be connected to a node by way of the switching element wherein the node is connected to a second input connection (e.g., ground connection) of the apparatus by way of the energy storage means. The output voltage can then be greater than, equal to or smaller than the input voltage of the apparatus. In this way, the impedance of the load can be matched to the source impedance of the generator over an even wider range in the sense of maximum power transmission.

It is advantageous if the detector has a current sensor for measuring the input current flowing through the input connections; if the current sensor is connected to a first input of a comparison device by way of a current-to-voltage converter; if a second input of the comparison device is connected to a reference voltage source; and if the output of the comparison device is connected to the measurement signal output of the detector. In this case, the current-to-voltage converter can, in the simplest case, be an electrical resistor that corresponds to the source impedance of the generator. The voltage output by the reference voltage source is preferably chosen such that it corresponds to the output voltage of the current-to-voltage converter when the output current of the generator corresponds to one half the short-circuit current of the generator and thus the power output by the generator is at the maximum. One practical embodiment to generate the reference voltage is a high-impedance resistive voltage divider connected in parallel to the input or in parallel with the input capacitor. The reference voltage is then available at the center tap of the voltage divider. Consequently, no external reference voltage source is necessary. This reduces the overall size and avoids additional power losses.

An output capacitor connected in parallel with the output connections is preferred for smoothing the output voltage. Using the apparatus, an alternating input voltage can then be converted efficiently into a semi-constant output voltage.

Exemplary embodiments of the invention are explained below in more detail based on the drawing.

DETAILED DESCRIPTION OF THE INVENTION

Figure 1:
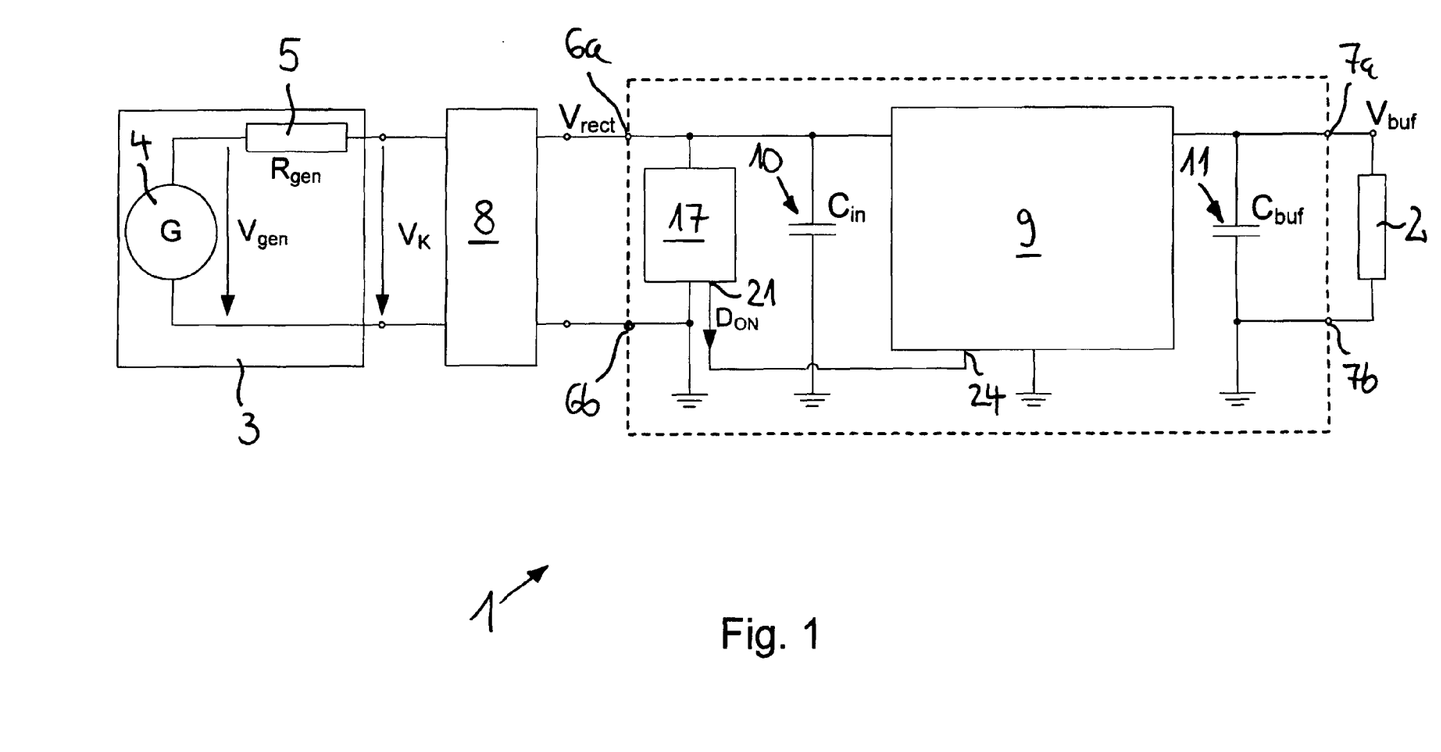
FIG. 1 shows a schematic of an apparatus, containing a converter, for matching the impedance of an electrical load to the source impedance of a generator.

An apparatus for matching the impedance of an electrical load 2 to a generator 3 identified in FIG. 1 as a complete unit with 1 has input connections 6a, 6b and output connections 7a, 7b. The input connections 6a, 6b are connected to the output of the generator 3 by way of a rectifier 8. The load 2 is connected to the output connections 7a, 7b.

The generator 3 typically provides an alternating voltage at its output, said voltage being created by a voltage source 4 connected in series with a source impedance 5. The alternating voltage may deviate from a sinusoidal wave and may have nonharmonic components. However, it is also possible that the generator 3 is a direct-voltage generator; in this case, the rectifier 8 may be omitted.

The series circuit, consisting of the voltage source 4 and the source impedance 5, is arranged in parallel to the output of the generator 3. The voltage generated by the voltage source 4 corresponds to the open-circuit voltage $V_{gen}$ of the generator, thus the voltage present at the output of the generator 3 when not carrying any current. If an electrical current is taken from the output of the generator 3, this causes a voltage drop across the source impedance 5. In this case, the output voltage $V_K$ of the generator 3 is reduced with respect to the open-circuit voltage by the voltage drop. Typically, the generator 3 provides its maximum power at its output if the output voltage VK is half as large as the open-circuit voltage Vgen.

The input connections 6a, 6b are connected to the output connections 7a, 7b by way of a converter 9 by means of which the input voltage corresponding to the output voltage Vrect of the rectifier 8 present between the input connections 6a, 6b can be converted into an output voltage, different from said input voltage, present between the output connections 7a, 7b. The input connections 6a, 6b are connected to one another by way of an input capacitor 10 that serves as a buffer. In a corresponding manner, the output connections 7a, 7b are connected to one another by way of an output capacitor 11.

As an energy storage means, the converter has an inductor 12 that is connected to a controllable switching device 13. In the exemplary embodiment shown in FIG. 2, the switching device 13 is formed by a switching transistor that has a source, a drain and a gate.

Figure 2:
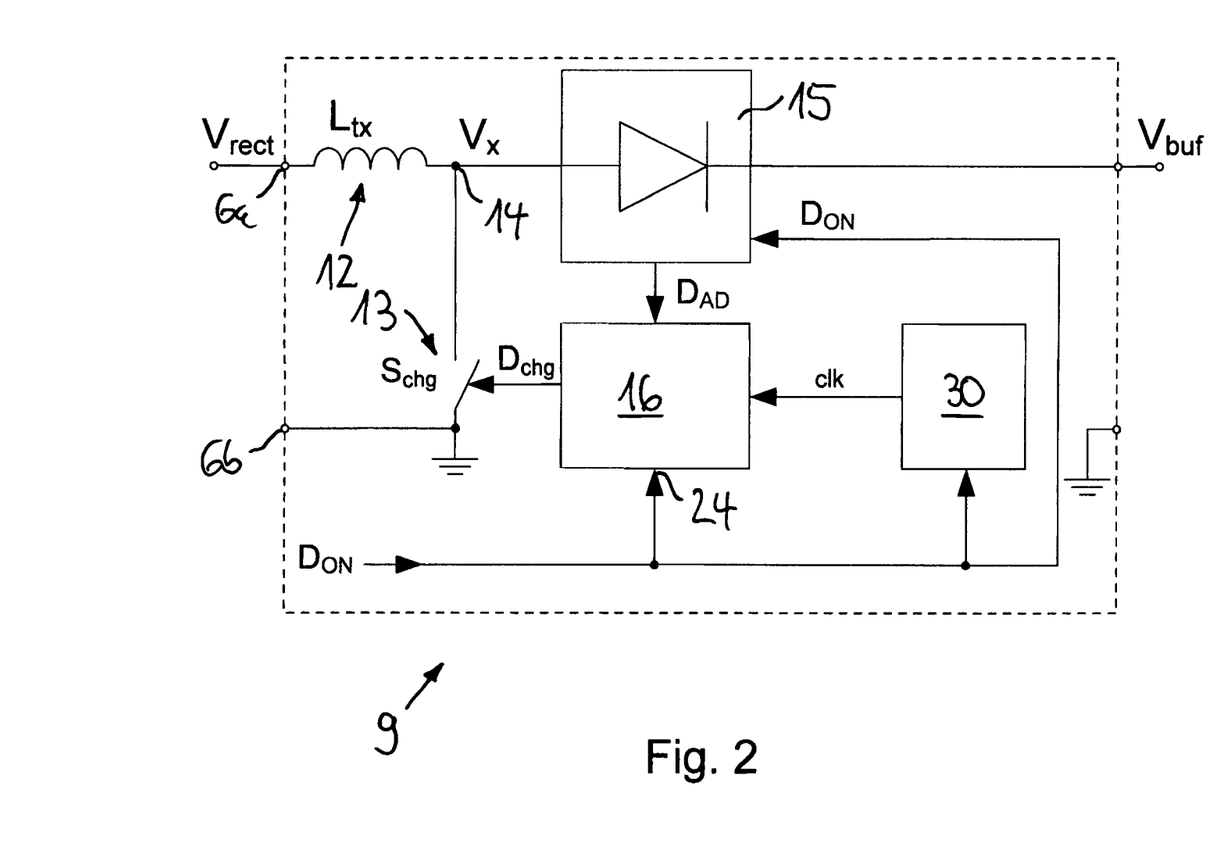
FIG. 2 depicts a schematic of a converter intended for boost operation.

The inductor 12 connects a first input connection 6a to a node 14 that is connected, by way of the source-drain section of the switching device 13, to a second input connection 6b that is at ground potential. The node is also connected to at least one first output connection 7a by way of an active diode 15. A second output connection 7b is at ground potential.

The gate of the switching device 13 is connected to an actuation device 16 by means of which the switching device 13 can be moved into an open position and a closed position. In the closed position, the inductor 12 is connected in parallel with the input connections 6a, 6b carrying the input voltage causing the current in the inductor 12 to increase and magnetic energy to be stored in the inductor 12. In the open position, the energy, in the form of an electrical induction voltage, is released and output to the load 2 by way of the active diode 15.

Figure 3:
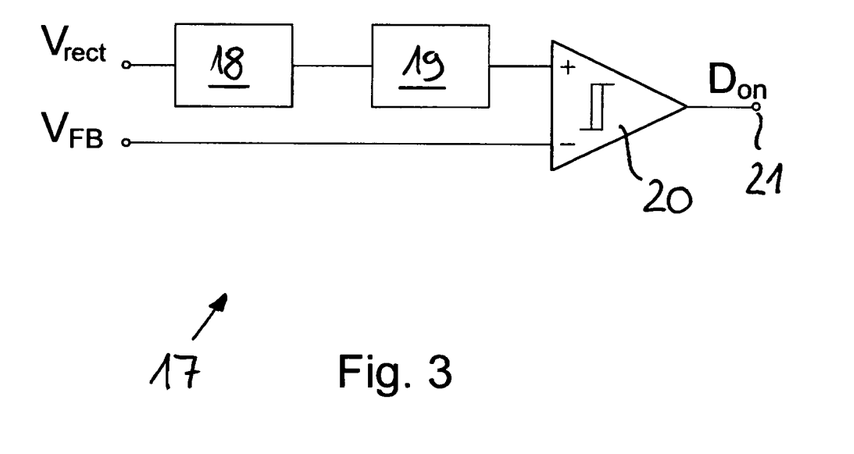
FIG. 3 illustrates a schematic of a detector for detecting a measurement signal for the impedance matching.

The apparatus also has a detector 17, connected to the input connections, for detecting a measurement signal for the impedance matching. As can be seen in FIG. 3, the detector 17 has a current sensor 18 that measures the current flowing via the input connections 6a, 6b. One output of the current sensor 18 is connected by way of a current-to-voltage converter 19 to a first input of a comparison device 20 exhibiting hysteresis. A reference voltage is applied to a second input of the comparison device 20, said reference voltage being selected so that it is identical to the voltage at the first input of the comparison device 20 when the generator 3 outputs its maximum power.

One practical embodiment to generate the reference voltage is a high-impedance resistive voltage divider connected in parallel with the input or in parallel with the input capacitor. The reference voltage is then available at the center tap of the voltage divider. Consequently, no external reference voltage source is necessary. This reduces the overall size and avoids additional power losses. However, other embodiments of the detector 17 with which an appropriate measurement signal can be output are conceivable.

The measurement signal Don present at the measurement signal output 21 of the comparison device 20 has a logical value of "1" when the input voltage of the apparatus 1 is within a range specified by the reference voltage and the hysteresis, i.e., when the power output of the generator 3 is at a maximum or very close to the maximum. If the input voltage of the apparatus 1 is not in the cited range, the measurement signal Don has the logical value of "0."

Figure 4:
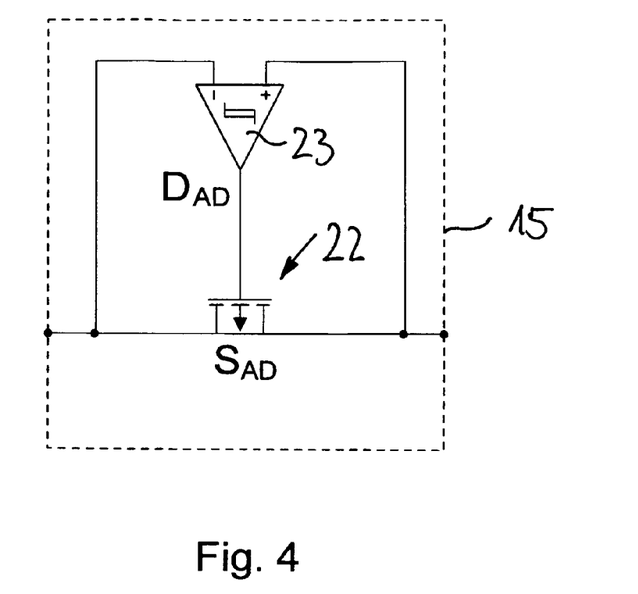
FIG. 4 is a schematic of an active diode.

FIG. 4 shows that the active diode 15 has a field effect transistor with a drain, a source and a gate as the switching element 22. In addition, the active diode 15 has a comparator 23 that preferably exhibits hysteresis. The comparator 23 has a first comparator input connected to the source and a second comparator input connected to the drain. The output of the comparator 23 is connected to the gate of the switching element 22. The active diode 15 may also have a bias voltage circuit that is not shown in more detail in the drawing.

Figure 5:
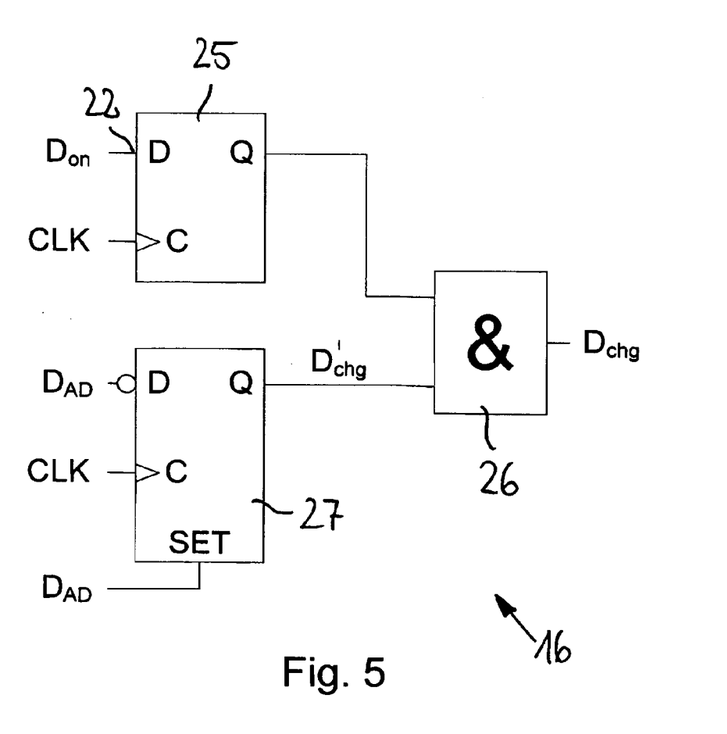
FIG. 5 shows a schematic of a first exemplary embodiment of an actuation device for a controllable switching device of the converter.

FIG. 5 shows that a first exemplary embodiment of the actuation device 16 has an activation input 22 that is connected to the measurement signal output 21 of the detector 17. Using the activation input 22, the actuation device 16 can be moved into a first and a second operating state. In the first operating state, the switching device 13 is in the open position and switching into the closed position is inhibited. The converter 9 is also switched off or inactive. In the second operating state, the switching device 13 can be switched between the open and the closed position so that the converter 9 converts the input voltage into the output voltage, i.e., energy is transferred from the input capacitor 10 via the converter 9 to the load 2 and into the output capacitor 11.

The activation input 22 is connected to the D input of a first D flip-flop 25 that is connected with its output to a first input of an AND gate 25. The actuation device 16 also has a second D flip-flop 27 that is connected with its inverting D input to the output of the comparator 23. The output of the comparator 23 is also connected to a Set input of the second D flip-flop 27. One output of the second D flip-flop 27 is connected to a second input of the AND gate 26. FIG. 5 also shows that each D flip-flop 25, 28 has a clock signal input to which a clock signal, provided by a clock generator 30, is applied. The output of the AND gate 26 is connected to the gate of the switching device 13. The switching device 13 is thus opened and closed as a function of the control signal Dchg present at the output of the AND gate 26.

Figure 6:
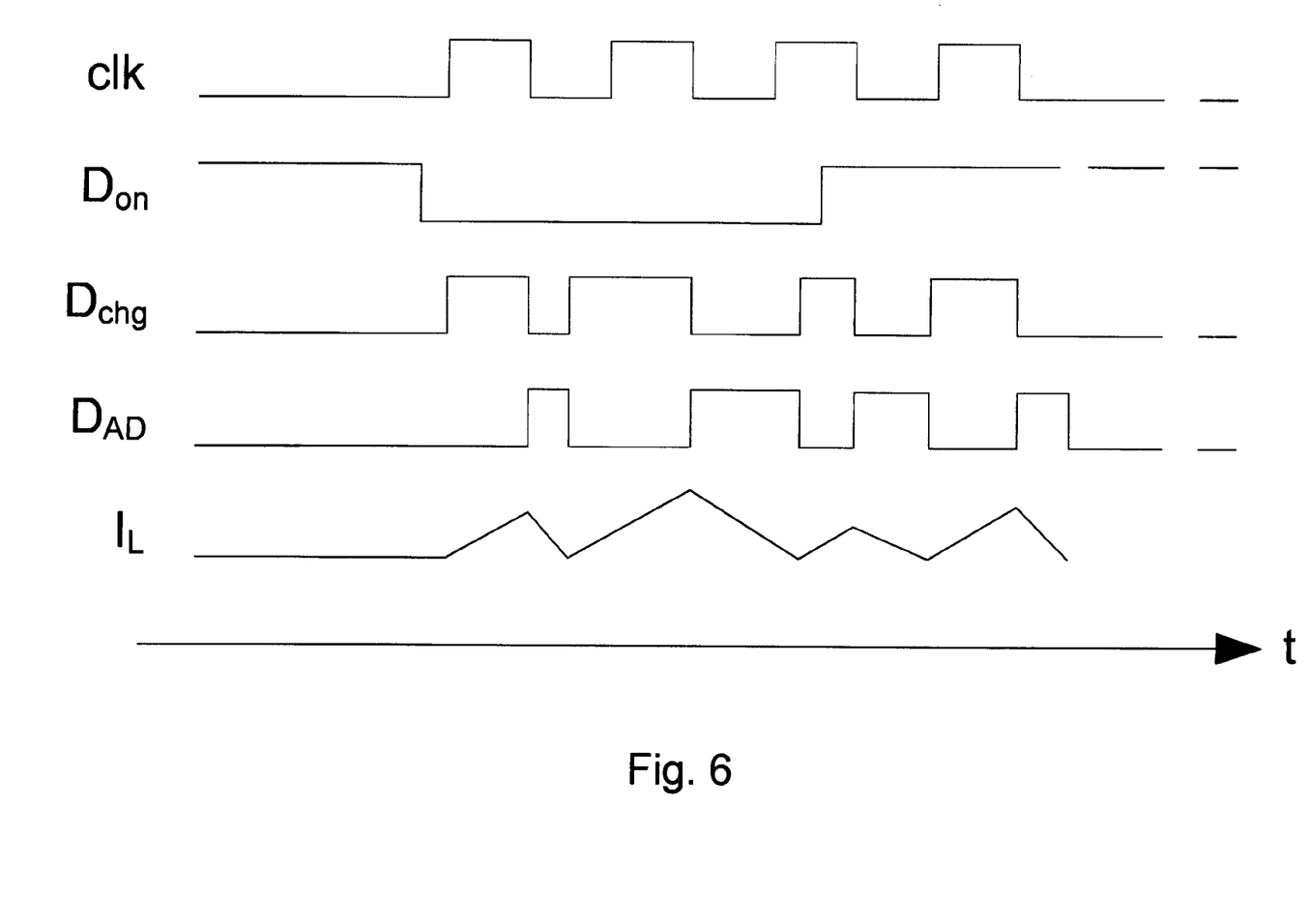
FIG. 6 is a timing diagram of various electrical signals of a first exemplary embodiment of the apparatus wherein the abscissa shows time and the ordinate shows the electrical voltage for the signals clk, Don, Dchg and DAD and the current for the signal $I_L$.

The operation of the converter 9 is explained in the following using FIG. 6.

The converter 9 is activated by means of the measurement signal Don of the detector 17. Until then, the converter 9 is high resistance, i.e., the switching device 13 and the switching element 22 are both open and the inductor 12 carries no current.

A start pulse is generated by the actuation device 16 through logic gating of the measurement signal Don and the rectangular-wave clock signal clk at the output of the AND gate 26. In this way, the switching device 13 is closed for one half period, i.e., the node 14 is connected to ground potential by way of the switching device 13. During this half period, initially a continuously increasing current builds up in the inductor 12. To do this, the inductor 12 absorbs energy from the input capacitor 10 and/or the generator 3.

After this half period, synchronized with the falling clock edge of the clock signal clk, the switching device 13 is opened again inducing a voltage in the inductor 12, which switches the comparator 23. As a result, the active diode 15 conducts, i.e., the node 14 is connected via a low-resistance path to the first output connection 7a by way of the switching element 22. The current $I_L$ in the inductor 12 continues to flow but decreases.

If the current flowing through the inductor 12 and the switching element 22 becomes too small, this is detected by the comparator 23 and the level at its output switches (signal DAD). As a result of this, the switching element 22 blocks the active diode 15.

Since the output signal DAD of the comparator 23 is also present at the D input of the second D flip-flop 27 of the actuation device 16, the change in level of the output signal DAD also directly causes the switching device 13 to open again. This implicitly achieves a duty cycle adjustment.

Then, the current through the inductor 12 increases again. With the next period of the clock signal clk, the switching device 13 is closed and the steps listed above are repeated.

The current $I_L$ in the inductor 12 loss thus always increases for the remaining time of a clock period where energy is transferred from the input capacitor 10 to the inductor 12.

In the exemplary embodiment of the actuation device 16 shown in FIG. 5, the switching device 13 is always opened synchronized to the clock but closed again not synchronized to the clock of the output signal DAD of the active diode.

If the level of the measurement signal Don of the detector 17 changes back again, this is detected by the actuation device 16. The energy transfer via the converter 9, or the switching of the inductor 12, ends the next time the active diode 15 is blocked, i.e., when the current through the inductor 12 has decreased the next time via the active diode 15 into the first output connection and/or the output capacitor 11.

Adjusting the duty cycle ratio to the instantaneous voltage differences of the first input connection 6a and the first output connection 7a is based on a temporal negative feedback: If, in one clock period, the current charging phase (switching device 13 closed) is longer than necessary, a relatively large current builds up. To decrease this again, the next current discharge phase (switching element 22 of the active diode 15 closed) must be correspondingly long so that the current can discharge through the inductor 12 again. As a result, however, the next following current charging phase is shorter. That is, the duty cycle ratio automatically remains in equilibrium or stabilizes and converges to an average value.

In contrast to a regulated synchronous switching controller, it is not a disadvantage here if the duty cycle ratio deviates somewhat from the nominal value. The active diode 15 blocks reverse currents and the coupled level changes ensure a reliable change between the charging and discharging phases of the inductor 12.

Figure 7:
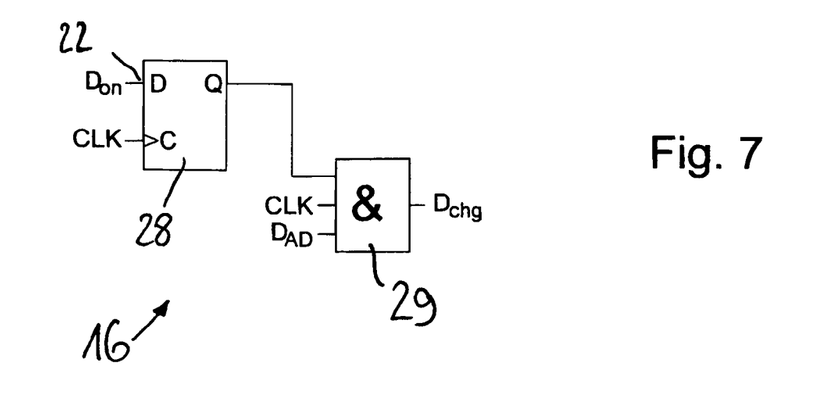
FIG. 7 shows a schematic of a second exemplary embodiment of the actuation device for the controllable switching device of the converter.

FIG. 7 shows a second exemplary embodiment of the actuation device 16 in which the switching device 13 is opened and closed by way of the control signal Dchg synchronized to the clock signal clk. The activation input 22 is connected for this purpose to the D input of a D flip-flop 28 that has its output connected to a first input of an AND gate 29. The clock signal clk is connected to a second input of the AND gate 29. A third input of the AND gate is connected to the output of the comparator 23.

Figure 8:
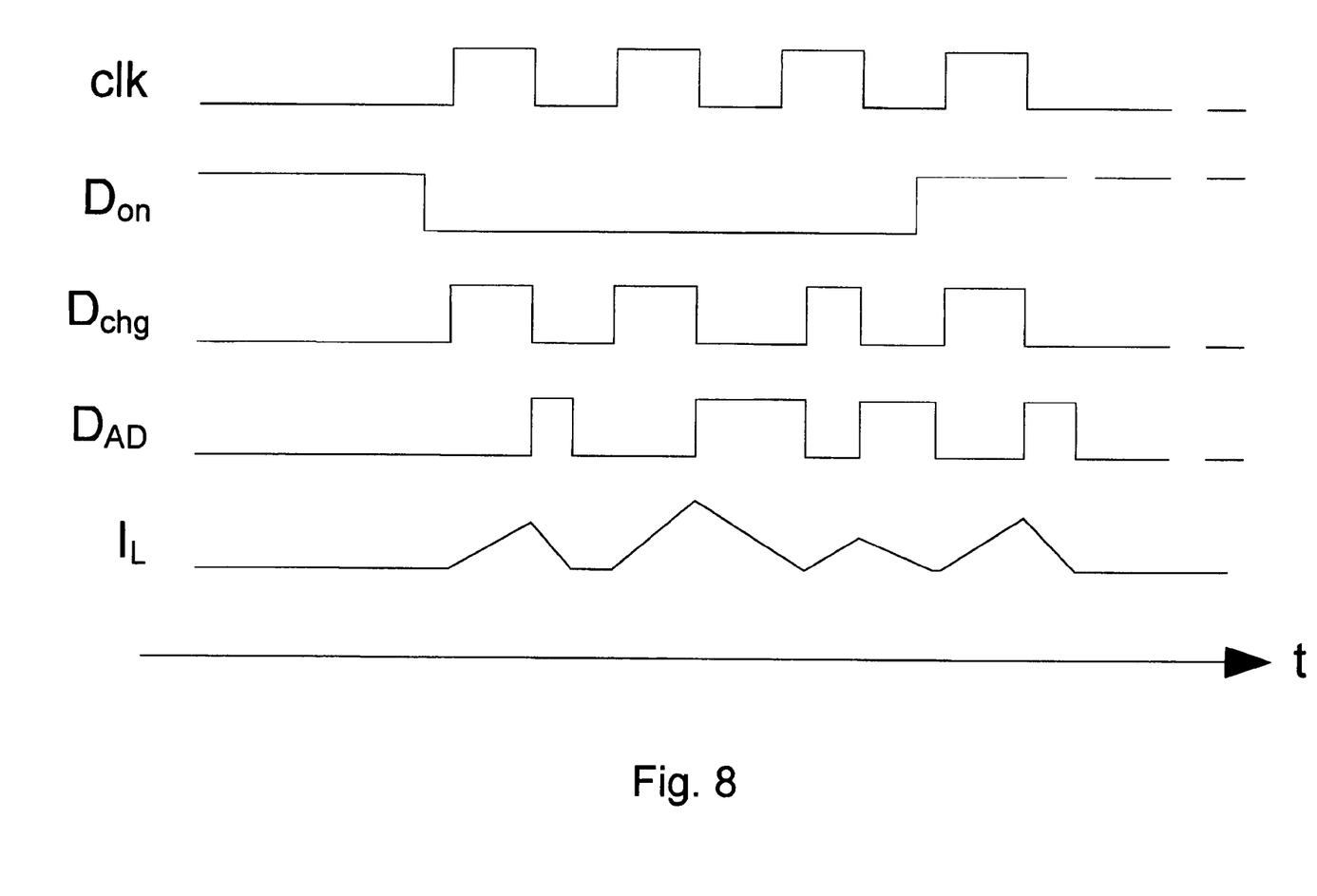
FIG. 8 is a timing diagram of various electrical signals of a second exemplary embodiment of the apparatus wherein the abscissa shows time and the ordinate shows the electrical voltage for the signals clk, Don, Dchg and DAD and the current for the signal $I_L$.

Also in the second exemplary embodiment of the actuation device 16, the converter 9 is activated by way of the measurement signal Don of the detector. Until then, the converter 9 is high resistance, i.e., the switching device 13 and the switching element 22 are both open and the inductor 12 carries no current.

A start pulse is generated by the actuation device 16 through logic gating of the measurement signal Don and the clock signal clk at the output of the AND gate 29 synchronized to the clock signal clk. In this way, the switching device 13 is closed for one half period. During this half period, initially, a continuously increasing current builds up in the inductor 12. To do this, the inductor 12 absorbs energy from the input capacitor 10 and the generator 3.

After this half period, synchronized with the falling clock edge of the clock signal clk, the switching device 13 is opened again inducing a voltage in the inductor 12 causing a voltage drop at the source-drain section of the switching element 22 that switches the comparator 23. This causes the active diode 15 to conduct. The current $I_L$ in the inductor 12 continues to flow but decreases.

If the current flowing through the inductor 12 and the switching element 22 becomes too small, this is detected by the comparator 23 and the level at its output changes (output signal $D_{AD}$). As a result of this, the switching element 22 blocks the active diode 15.

As the output signal DAD of the comparator 23 is present at the third input of the AND gate 29 and the clock signal clk is present at the second input of the AND gate 29, the output signal $D_{chg}$ of the AND gate 29 is not switched and the switching device 13 not opened again until the edge of the clock signal following the level change of the output signal DAD. This implicitly achieves a duty cycle adjustment in discontinuous mode.

Then, the current through the inductor 12 increases again. With the next period of the clock signal clk, the switching device 13 is closed and the steps listed above are repeated.

Figure 9:
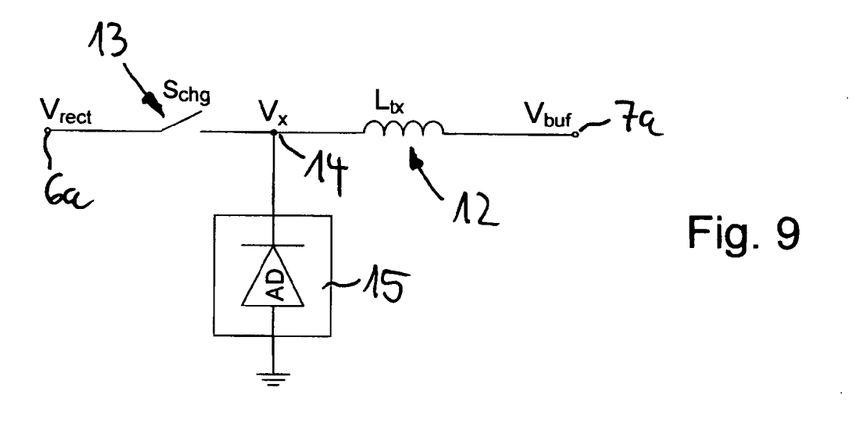
FIG. 9 depicts a partial schematic of a buck converter.

FIG. 9 shows that the converter 9 can also be configured as a buck converter. The first input connection 6a can, in this circuit, be connected to the node 14 by way of the switching device 13 and the second input connection 6b as well as the second output connection 7b can be connected to the node 14 by way of the switching element 22 of the active diode 15. The node 14 is connected to the first output connection 7a by way of the inductor 12.

Figure 10:
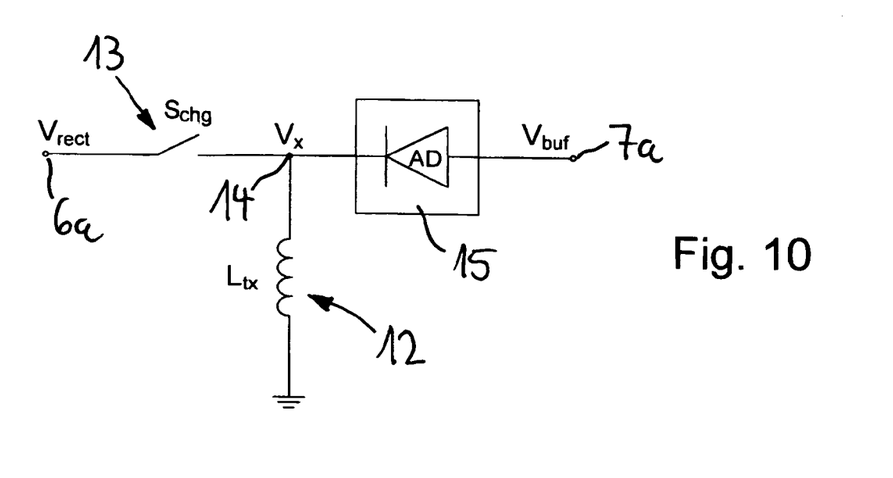
FIG. 10 depicts a partial schematic of a boost and buck converter.

The exemplary embodiment of the converter shown in FIG. 10 is suitable for boost and buck operation. The first input connection 6a, in this circuit, is connected to the node 14 by way of the switching device 13. In addition, the node 14 is connected to the first output connection 7a by way of the switching element 22 of the active diode 15 and to the second input connection 6b and the second output connection 7b by way of the inductor 12.

The invention claimed is:

1. An apparatus for the impedance matching of an electric load to the source impedance of a generator wherein the apparatus has input connections for connecting to the generator and output connections for connecting to the load; wherein the apparatus has a converter, which connects the input connections to the output connections by means of which an input voltage, which is applied between the input connections, can be converted into an output voltage different from this input voltage between the output connections; wherein the converter has an energy storage means, a controllable switching device which is connected to said energy storage means and an actuation device for said switching device; wherein the switching device is designed and can be moved to a first and a second switching state in such a way that, in the first switching state, energy from the generator can be stored in the energy storage means and, in the second switching state, energy stored in the energy storage means can be output to the load; wherein the apparatus has a detector, which is connected to the input connections, for detecting a measurement signal for the impedance matching; wherein the actuation device has an activation input by means of which it can be moved to a first and a second operating state; wherein the actuation device is designed in such a way that the first switching state is avoided in the first operating state and a changeover is made between the switching states in the second operating state; and wherein the detector is connected with its measurement signal output to the activation input characterized by the fact that the energy storage device is connected to at least one of the output connections by way of an active diode; that the active diode has a controllable switching element and a comparator having a first comparator input connected to a first load connection of the switching element and a second comparator input connected to a second load connection of the switching element; and that the output of the comparator is connected to a control connection of the switching element and a control input of the switching device.

2. The apparatus according to claim 1, wherein the energy storage device has at least one inductor.

3. The apparatus according to claim 1, wherein the comparator exhibits hysteresis.

4. The apparatus according to claim 1, wherein the output of the comparator is connected to the control input of the switching device by way of a delay element.

5. The apparatus according to claim 1, wherein the input connections are connected to one another by way of an input capacitor serving as a buffer.

6. The apparatus according to claim 1, wherein the switching element is a field effect transistor.

7. The apparatus according to claim 1, wherein the actuation device has a clock generator for generating a clock signal; and that the output of the comparator is connected to the switching device to provide a control signal synchronized with the clock signal by way of a synchronization device connected to the clock generator.

8. The apparatus according to claim 1, wherein the energy storage means connects a first input connection of the apparatus to a node; and that the node can be connected to one output connection of the apparatus via the switching element and to a second input connection of the apparatus via the switching device.

9. The apparatus according to claim 1, wherein a first input connection of the apparatus can be connected to a node via the switching device and a second input connection of the apparatus can be connected to a node by way of the switching element; and that the node can be connected to one output connection of the apparatus by way of the energy storage means.

10. The apparatus according to claim 1, wherein a first input connection of the apparatus can be connected to a node via the switching device and an output connection of the apparatus can be connected to a node by way of the switching element; and that the node can be connected to a second input connection of the apparatus by way of the energy storage means.

11. The apparatus according to claim 1, wherein the detector has a current sensor for measuring the input current flowing through the input connections; that the current sensor is connected to a first input of a comparison device by way of a current-to-voltage converter; that a second input of the comparison device is connected to a reference voltage source; and that the output of the comparison device is connected to the measurement signal output of the detector.

12. The apparatus according to claim 1, wherein an output capacitor is connected in parallel with the output connections for smoothing the output voltage.

13. The apparatus according to claim 1, wherein the switching device is a switching transistor.

* * * * *